J. E. BEST & W. E. HIGGINS.
Thill-Coupling Jack.
No. 226,020. Patented Mar. 30, 1880.
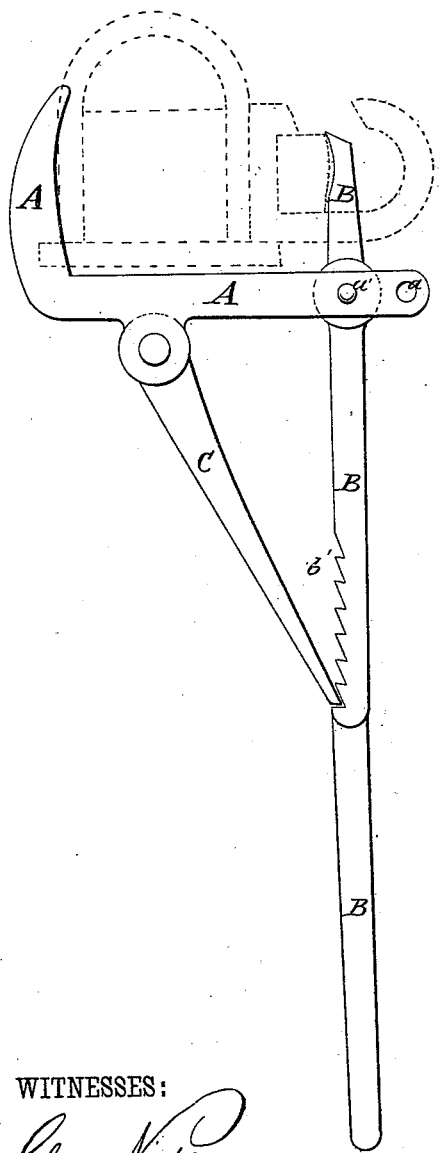
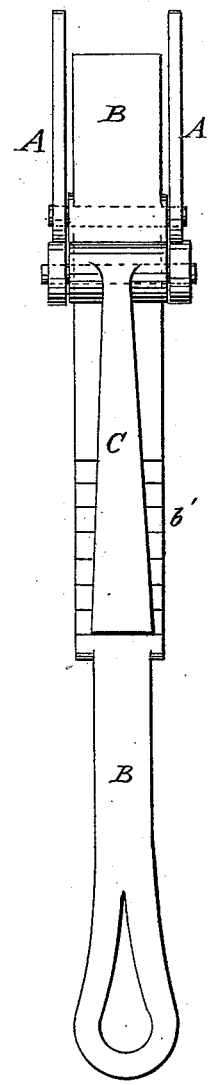

UNITED STATES PATENT OFFICE.

JOHN E. BEST AND WILLIAM E. HIGGINS, OF ARLINGTON HEIGHTS, ILL.

THILL-COUPLING JACK.

SPECIFICATION forming part of Letters Patent No. 226,020, dated March 30, 1880.

Application filed September 12, 1879.

*To all whom it may concern:*

Be it known that we, JOHN E. BEST and WILLIAM E. HIGGINS, of Arlington Heights, in the county of Cook and State of Illinois, have invented a new and useful Improvement in Thill-Coupling Jacks, of which the following is a specification.

Figure 1 is a side elevation of our improved jack. Fig. 2 is a rear elevation of the same.

Similar letters of reference indicate corresponding parts.

The object of this invention is to furnish an improved implement for compressing the rubber in a thill-coupling to allow the thill-eye or coupling-bolt to be readily inserted.

A represents a pair of hooks. To and between the shanks of the hooks A is pivoted a lever, B, with its upper end projecting.

Several holes $a'$ are formed in the shanks of the hooks A, to receive the pivots, so that the said hooks can be adjusted, as the thickness of the axle may require.

To the shanks of the hooks A is pivoted a pawl, C, which engages with ratchet-teeth $b'$, formed upon the side of the lever B.

In using the implement the hooks A are hooked upon the inner side of the axle, with the end of the lever B resting against the rubber or the eye of the thill-iron, according to the construction of the coupling, and the rubber can be compressed by operating the said lever B, so that the said eye or the coupling-bolt can be readily inserted.

When the rubber has been compressed the pawl C may be swung into gear with the teeth $b'$, to hold the implement in place while inserting the eye or bolt of the coupling.

The hooks A may be replaced by a U-bar, which is passed around the clip bolts or yoke, and is provided with a lever, B, and a pawl, C, in the manner hereinbefore described.

The hooks A are placed beneath the axle when the thills have to be raised in coupling, and above the axle when the thills can be coupled without being raised.

The hooks A should be faced with rubber or leather to prevent them from marring the paint.

Having thus described our invention, we claim as new and desire to secure by Letters Patent—

A thill-coupling jack consisting of the rack-lever B and two hooks, A A, the latter being pivoted near the end of lever, and provided on the back with a pivoted brace, C, as shown and described.

JOHN E. BEST.
WILLIAM EDWARD HIGGINS.

Witnesses:
PETER S. WALLING,
W. H. DUNTON.